(12) United States Patent
Wan et al.

(10) Patent No.: US 10,613,227 B2
(45) Date of Patent: Apr. 7, 2020

(54) METHOD AND APPARATUS FOR POSITIONING VEHICLE

(71) Applicant: Baidu Online Network Technology (Beijing) Co., Ltd., Beijing (CN)

(72) Inventors: Guowei Wan, Beijing (CN); Hao Wang, Beijing (CN); Shiyu Song, Beijing (CN); Baoqiang Xu, Beijing (CN)

(73) Assignee: Baidu Online Network Technology (Beijing) Co., Ltd, Beijing (CN)

( * ) Notice: Subject to any disclaimer, the term of this patent is extended or adjusted under 35 U.S.C. 154(b) by 213 days.

(21) Appl. No.: 15/882,131

(22) Filed: Jan. 29, 2018

(65) Prior Publication Data
US 2018/0306922 A1    Oct. 25, 2018

(30) Foreign Application Priority Data

Apr. 20, 2017    (CN) .......................... 2017 1 0263504

(51) Int. Cl.
| | |
|---|---|
| *G01S 17/42* | (2006.01) |
| *G01S 17/89* | (2020.01) |
| *G01S 17/02* | (2020.01) |
| *G05D 1/02* | (2020.01) |
| *G01S 19/42* | (2010.01) |
| *G01S 7/48* | (2006.01) |

(52) U.S. Cl.
CPC ............ *G01S 17/42* (2013.01); *G01S 7/4808* (2013.01); *G01S 17/023* (2013.01); *G01S 17/89* (2013.01); *G01S 19/42* (2013.01); *G05D 1/024* (2013.01); *G05D 1/0274* (2013.01)

(58) Field of Classification Search
CPC ....................................................... G01S 17/42
See application file for complete search history.

(56) References Cited

U.S. PATENT DOCUMENTS

| | | | | |
|---|---|---|---|---|
| 5,638,116 | A * | 6/1997 | Shimoura | G05D 1/0246 348/118 |
| 9,127,946 | B1 * | 9/2015 | Menon | G06Q 40/08 |
| 9,576,206 | B2 * | 2/2017 | Churchill | G01C 21/26 |
| 10,162,358 | B2 * | 12/2018 | Song | G01C 21/005 |
| 2008/0019567 | A1 * | 1/2008 | Takagi | G06K 9/00369 382/103 |
| 2009/0067675 | A1 * | 3/2009 | Tan | G06K 9/00798 382/104 |

(Continued)

FOREIGN PATENT DOCUMENTS

CN          106123890 A     11/2016

*Primary Examiner* — Alex C Dunn
(74) *Attorney, Agent, or Firm* — Knobbe, Martens, Olson & Bear, LLP (57) ABSTRACT

The present application discloses a method and apparatus for positioning a vehicle. An implementation of the method comprises: obtaining laser point cloud data of a laser point cloud collected by a laser radar on a vehicle, and obtaining an initial pose of a center point of the laser radar; calculating a matching probability between projection data corresponding to each sampling pose and map data of a reflected value map respectively; and calculating an optimal pose based on the matching probability between the projection data corresponding to the each sampling pose and the map data of the reflected value map, and determining a position of the vehicle based on the optimal pose.

9 Claims, 5 Drawing Sheets

(56) References Cited

U.S. PATENT DOCUMENTS

| | | | |
|---|---|---|---|
| 2011/0164037 A1* | 7/2011 | Yoshida | G06T 15/08 345/419 |
| 2014/0376777 A1* | 12/2014 | Churchill | G01C 21/26 382/104 |
| 2017/0344015 A1* | 11/2017 | Song | G01S 7/4808 |
| 2017/0344018 A1* | 11/2017 | Song | G01C 21/005 |
| 2019/0033465 A1* | 1/2019 | Kido | G01S 19/07 |

* cited by examiner

Fig. 5

METHOD AND APPARATUS FOR POSITIONING VEHICLE

CROSS-REFERENCE TO RELATED APPLICATION

This application is related to and claims the priority from Chinese Application No. 201710263504.6, filed on Apr. 20, 2017, entitled "Method and Apparatus For Positioning Vehicle," having Baidu Online Network Technology (Beijing) Co., Ltd. as the applicant, the entire disclosure of which is incorporated herein by reference.

TECHNICAL FIELD

The present application relates to the field of computer technology, specifically to the field of positioning, and more specifically to a method and apparatus for positioning vehicle.

BACKGROUND

A vehicle's ability to perceive an environment is the most important index to measure the intelligence of the vehicle. Accurate positioning of the vehicle is a basis of environment perception for the vehicle. At present, GPS is usually used to position a vehicle in conjunction with inertial navigation equipment. However, due to large error of data outputted by the GPS and the inertial navigation equipment, it is difficult to position the vehicle with high precision.

SUMMARY

The present application provides a method and apparatus for positioning a vehicle to solve the technical problems mentioned in the background section.

In a first aspect, the present application provides a method for positioning a vehicle, and the method includes: obtaining laser point cloud data of a laser point cloud collected by a laser radar on a vehicle, and obtaining an initial pose of a center point of the laser radar, the laser point cloud data including coordinates of laser points under a coordinate of the laser radar, and the initial pose including an initial plane position and an initial yaw angle of the center point of the laser radar in a world coordinate system; calculating a matching probability between projection data corresponding to each sampling pose and map data of a reflected value map respectively, the sampling pose including a sampling plane position in a preset range of the initial plane position, and a sampling yaw angle in a preset range of the initial yaw angle, the projection data including a mean value and a variance of reflected values or heights of laser points in the collected laser point cloud based on projecting the sampling pose into a cell of the reflected value map and the map data comprising a preset mean value and a preset variance of the reflected values or heights corresponding to the cell; and calculating an optimal pose based on the matching probability between the projection data corresponding to the each sampling pose and the map data of the reflected value map, and determining a position of the vehicle based on the optimal pose, the optimal pose including an optimal plane position and an optimal yaw angle of the center point of the laser radar in the world coordinate system.

In a second aspect, the present application provides an apparatus for positioning a vehicle, the apparatus includes: an obtaining unit, configured for obtaining laser point cloud data of a laser point cloud collected by a laser radar on a vehicle, and obtaining an initial pose of a center point of the laser radar, the laser point cloud data comprising coordinates of laser points under a coordinate of the laser radar, and the initial pose comprising an initial plane position and an initial yaw angle of the center point of the laser radar in a world coordinate system; a calculating unit, configured for calculating a matching probability between projection data corresponding to each sampling pose and map data of a reflected value map respectively, the sampling pose including a sampling plane position in a preset range of the initial plane position, and a sampling yaw angle in a preset range of the initial yaw angle, the projection data including a mean value and a variance of reflected values or heights of laser points in the collected laser point cloud based on projecting the sampling pose into a cell of the reflected value map and the map data including a preset mean value and a preset variance of the reflected values or heights corresponding to the cell; and a positioning unit, configured for calculating an optimal pose based on the matching probability between the projection data corresponding to the each sampling pose and the map data of the reflected value map, and determining the position of the vehicle based on the optimal pose.

The method and apparatus for positioning a vehicle provided by the present application are capable of: obtaining laser point cloud data of a laser point cloud collected by a laser radar on a vehicle, and obtaining an initial pose of a center point of the laser radar; calculating a matching probability between projection data corresponding to each sampling pose and map data of a reflected value map respectively; and calculating an optimal pose based on the matching probability between the projection data corresponding to each sampling pose and the map data of the reflected value map, and determining a position of the vehicle based on the optimal pose. In the case of considering errors of a plurality of parameters including a plane position, a yaw angle etc. in the initial pose, the optimal pose of the center point of the laser radar is determined by using the matching probability between the projection data corresponding to collected laser point clouds and the map data of the reflected value map, and the position of the vehicle is then determined accurately.

BRIEF DESCRIPTION OF THE DRAWINGS

After reading detailed descriptions of non-limiting embodiments with reference to the following accompanying drawings, other features, objectives and advantages of the present disclosure will be more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
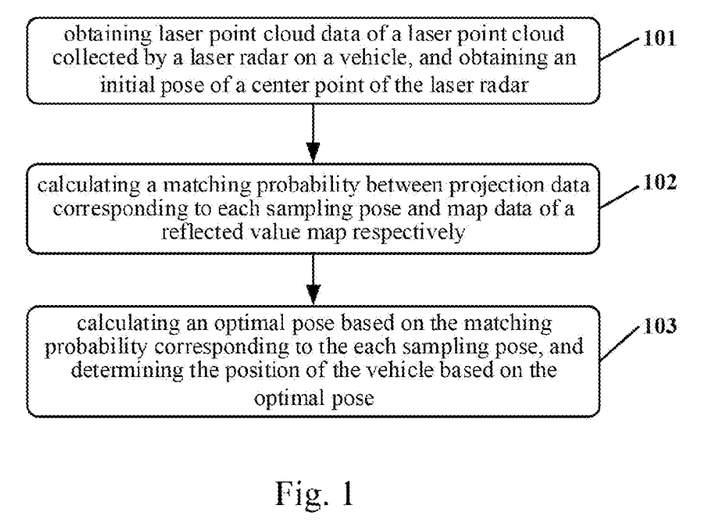
FIG. 1 shows a flow diagram of an embodiment of the method for positioning a vehicle according to the present application.

Please refer to FIG. 1, which shows a flow diagram of an embodiment of the method for positioning a vehicle according to the present application. The method can be executed by a processor on the vehicle, and correspondingly, a positioning apparatus can be arranged in the vehicle. The method includes the following steps:

In Step 101, laser point cloud data of a laser point cloud collected by a laser radar on a vehicle is obtained, and an initial pose of a center point of the laser radar is obtained.

In the present embodiment, the laser point clouds collected by the laser radar may refer to a frame of laser point clouds collected by the laser radar in a current sampling time period. The laser radar can scan a frame of laser point clouds in each scanning period. The laser point clouds collected by the laser radar may be obtained in real time. After each frame of laser point clouds is obtained, the frame of laser point clouds may be used to position the vehicle, thereby positioning the vehicle in real time.

In the present embodiment, the collected laser point clouds include a plurality of laser points; the laser radar may output laser point cloud data; and the laser point cloud data of the collected laser point cloud include coordinates of the laser points under a laser radar coordinate system.

In the present embodiment, the initial pose of the center point of the laser radar may be obtained by an inertial navigation equipment. The initial pose of the center point of the laser radar includes an initial three-dimensional coordinate, an initial yaw angle, an initial roll angle, and an initial pitch angle of the center point of the laser radar in a world coordinate system, e.g., a UTM coordinate system. The initial plane position of the center point of the laser radar includes a value of the initial three-dimensional coordinate of the center point of the laser radar under the UTM coordinate system on an x axis and a value on a y axis. For example, when the initial three-dimensional coordinate of the center point of the laser radar is represented by (x, y, z), (x, y) represents the initial plane position of the center point of the laser radar.

There is an error between the initial three-dimensional coordinate of the center point of the laser radar, obtained by the inertial navigation equipment, and an actual three-dimensional coordinate of the center point of the laser radar, and accordingly, there is an error between the initial plane position of the center point of the laser point and an actual plane position of the center point of the laser point. There is an error between the initial yaw angle of the center point of the laser radar, obtained by the inertial navigation equipment, and an actual yaw angle of the center point of the laser radar.

In Step 102, the matching probability between the projection data corresponding to each sampling pose and the map data of the reflected value map is calculated respectively.

In the present embodiment, the reflected value map may be established in advance in the following approaches: regarding a horizontal plane of the surface of the earth as a map area of the reflected value map, and dividing the interior of the horizontal plane of the surface of the earth into nodes with fixed sizes, wherein each node may cover a fixed territorial scope. Each node may be re-divided into a plurality of cells, and each cell may cover a fixed territorial scope. The plurality of cells can form a cell array in the node. When a coordinate, e.g., the UTM coordinate of a spatial position of a point under the UTM coordinate system is given, the nodes in the reflected value map to which the point is projected may be determined first when the point is projected to the reflected value map according to the values of the UTM coordinate of the specific position on the x axis and the y axis. Then, a subscript of a cell in the node to which the point is projected, when the point is projected to the reflected value map, may be determined according to the UTM coordinate at the top left angle of the node, and lengths of the cell in an x-axis direction and a y-axis direction, for example, the lengths of sides of the cell when the cell is square. The subscript of the cell may be represented by (i, j), i may represent a serial number of the cell in the x-axis direction in the node of the reflected value map, and j may represent a serial number of the cell in the y-axis direction in the reflected value map.

In the present embodiment, a plurality of frames of historical laser point clouds may be collected in advance, and a matching relation between the historical laser point clouds is established by using overlapping parts of the historical laser point clouds to correct poses corresponding to the historical laser point clouds, thereby obtaining accurate poses corresponding to the historical laser point clouds. Then, UTM coordinates of laser points of the historical laser point clouds may be determined according to the accurate poses corresponding to the historical laser point clouds. The cells in the reflected value map to which the laser points in the historical laser point clouds are projected may be determined according to the UTM coordinates of the laser points in the historical laser point clouds, so that the laser points in the historical laser point clouds may be projected to corresponding cells. A mean value of reflected values or heights and a variance of the reflected values or the heights of the laser points, projected to each cell, in the historical laser point clouds may be calculated respectively. The mean value of the reflected values or the heights of the laser points, projected to each cell, in the historical laser point clouds may be regarded as a preset mean value corresponding to each cell respectively, and the variance of the reflected values or the heights of the laser points, projected to each cell, in the historical laser point clouds may be regarded as a preset variance corresponding to each cell respectively.

Therefore, each cell has corresponding preset mean value of the reflected values or the heights and the preset variance of the reflected values or the heights, which may be used for follow-up matching with projection data corresponding to a sampling pose.

In the present embodiment, a plurality of sampling poses of the center point of the laser radar may be generated first in consideration of influences of errors between the initial plane position of the center point of the laser radar and the actual plane position of the center point of the laser radar, errors between the initial yaw angle of the center point of the laser radar and the actual yaw angle of the center points of the laser radar, and other errors obtained by the inertial navigation equipment on a result of follow-up matching between the projection data corresponding to the laser point clouds and the map data of the reflected value map. The sampling pose of the center point of each laser radar includes a sampling plane position and a sampling yaw angle of the center point of the laser radar. The sampling plane position may represent a possible actual plane position of the center point of the laser radar, and the sampling yaw angle may represent a possible actual yaw angle of the center point of the laser radar.

In the present embodiment, the sampling plane position of the center point of the laser radar may be obtained by sampling in the preset range of the initial plane position of the center point of the laser radar. The preset range of the initial plane position of the center point of the laser radar includes the initial plane position of the center point of the laser radar. The preset range of the initial plane position of the center point of the laser radar may be determined according to a value interval of the value on the x axis and a value interval of the value on the y axis. The value interval of the value on the x axis of the center point of the laser radar may be represented by Nx, and the value interval of the value on the y axis of the center point of the laser radar may be represented by Ny, so that the preset domain range of the initial plane position may be represented by Nx·Ny.

For example, the preset range is a rectangular area taking the initial plane position of the center point of the laser radar as a center. The rectangular area includes a plurality of cells, and the value interval of the value on the x axis of the center point of the laser radar may be defined by multiplying the number of the cells in the x-axis direction of the rectangular area by side lengths in the x-axis direction of the cells. The value interval of the value on the y axis of the center point of the laser radar may be defined by multiplying the number of the cells in the y-axis direction of the rectangular area by side lengths in the y-axis direction of the cells.

In the present embodiment, uniform sampling may be performed in the preset domain range of the yaw angle to obtain a plurality of sampling yaw angles. For example, the preset range of the yaw angle may be a yaw angle value interval taking the initial yaw angle of the center point of the laser radar as a midpoint, and the uniform sampling may be performed in the yaw angle value interval to obtain a plurality of sampling yaw angles. The absolute value of a difference value between each sampling yaw angle and the initial yaw angle is smaller than a difference value threshold.

In the present embodiment, the coordinates of the laser points in the laser point clouds collected in Step 201 are coordinates under a coordinate system of the laser radar, a spin matrix and a translation matrix need to be determined through the pose of the center point of the laser radar, and the coordinates under the coordinate system of the laser radar of the laser points in the collected laser point clouds are transformed by use of the spin matrix and the translation matrix, so as to obtain UTM coordinates under a UTM coordinate system of the laser points in the laser point clouds. The UTM coordinate X' of one laser point in the laser point clouds in the UTM coordinate system may be expressed as:

$$X'=RX+t.$$

X represents a three-dimensional coordinate of a position of the laser point under the laser radar coordinate system, and R represents the spin matrix, and t represents the translation matrix.

The spin matrix may be calculated according to a roll angle, a pitch angle and a yaw angle of the center point of the laser radar, and the translation matrix may be obtained according to the three-dimensional coordinate of the center point of the laser radar.

In the present embodiment, the spin matrix and the translation matrix corresponding to each sampling pose may be calculated respectively. When calculating the spin matrix corresponding to a sampling pose, the initial roll angle and the initial pitch angle of the center point of the laser radar may be used as the roll angle and the pitch angle of the sampling pose, and the yaw angle of the sampling pose is then a sampling yaw angle, so that the spin matrix corresponding to the sampling pose may be calculated according to the initial roll angle, the initial pitch angle and the sampling yaw angle. When calculating the translation matrix corresponding to a sampling pose, the value of x and the value of y in the three-dimensional coordinate in the translation matrix may adopt the value of x and the value of y in the sampling plane position, and the value of z may adopt the value of z in the initial three-dimensional coordinate.

After obtaining the spin matrix and the translation matrix corresponding to each sampling pose, UTM coordinates of the laser points in the collected laser point clouds corresponding to each sampling pose may be obtained based on the spin matrix and the translation matrix corresponding to each sampling pose, and cells to which the laser points in the collected laser point clouds are projected may then be determined according to the UTM coordinates of the laser points in the collected laser point clouds corresponding to each pose respectively, so that the laser points in the collected laser point clouds are projected into corresponding cells in the reflected value map respectively for each sampling pose. After projecting the laser points in the collected laser point clouds to the corresponding cells in the reflected value map respectively for each sampling pose, projection data corresponding to each sampling pose may be further calculated respectively. The projection data corresponding to each sampling pose include: a mean value of reflected values or heights of the laser points projected to each cell and a variance of the reflected values or the heights of the laser points projected to each cell after the laser points in the collected laser point clouds are projected to the corresponding cells in the reflected value map according to the sampling pose.

In the present embodiment, sampling positions in a plurality of sampling poses are different, and may be regard as moving the initial plane position of the center point of the laser radar in the initial pose in the domain range of the initial plane position, and the plane position of the center point of the laser radar after moving is a sampling plane position. For example, the initial plane position of the center point of the laser radar in the initial pose is moved in an area including $N_x*N_y$ cells, $N_x$ represents the number of the cells in the x-axis direction in this area, and $N_y$ represents the number of the cells in the y-axis direction in this area. A sampling position of the center point of the laser radar may be obtained by translating the center point of the laser radar for a distance of one cell in the x-axis direction or for a distance of one cell in the y-axis direction from the initial plane position.

Because the coordinates of the laser points in the collected laser point clouds under the UTM coordinate system are associated with the plane position and the yaw angle of the center point of the laser radar, the coordinates of the laser points in the collected laser point clouds under the UTM coordinate system, which are obtained by using different sampling poses, are different, and the distribution of the laser points is also different. After projecting the collected laser point clouds for each sampling pose, each sampling pose may correspond to different projection data, and accordingly, each sampling pose may correspond to different matching probabilities between corresponding projection data and the map data of the reflected value map. The matching probability between the projection data corresponding to each sampling pose and the map data of the reflected value map may be calculated respectively after the collected laser point clouds are projected for each sampling pose. When calculating the matching probability between the projection data corresponding to a sampling pose and the map data of the reflected value map, after projecting the collected laser points in the laser point clouds for the sample pose, the mean value and the variance of reflected values or heights of laser points in the collected laser point cloud corresponding to the each cell of the reflected value map may be calculated.

Figure 2:
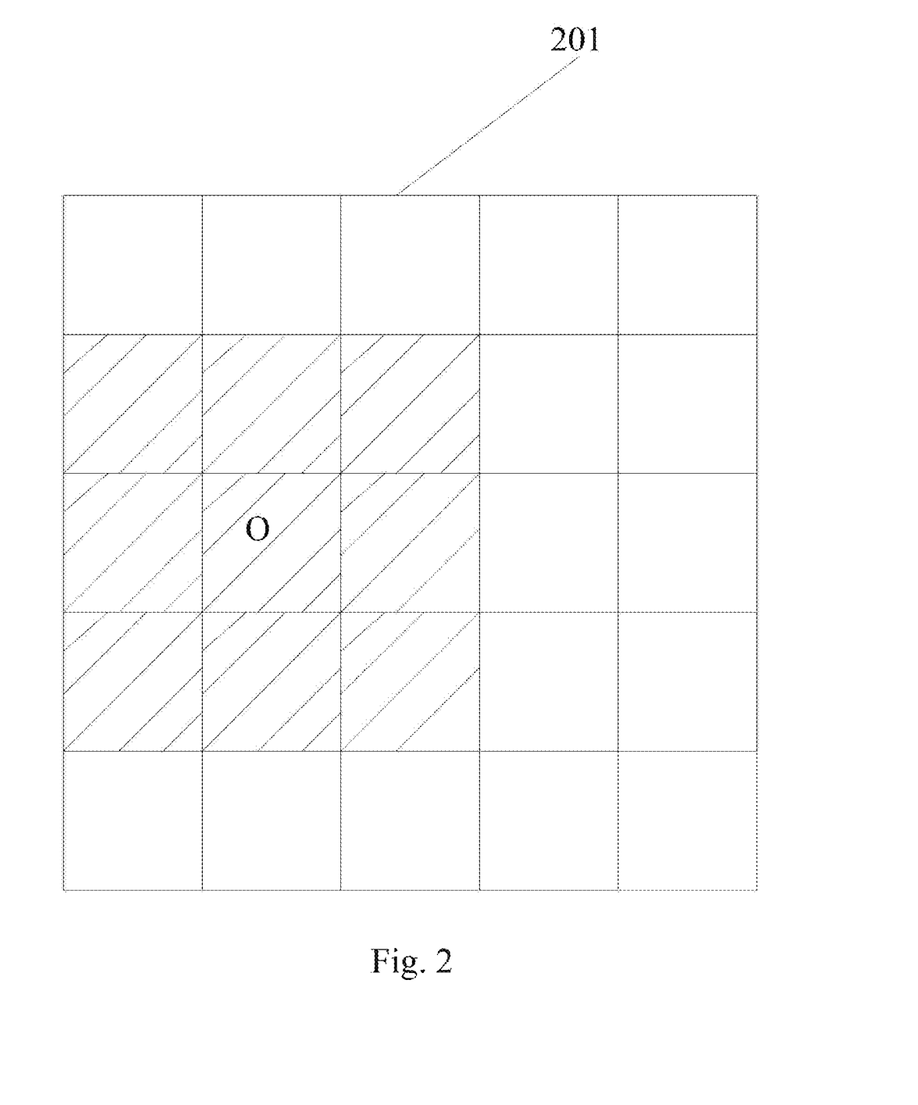
FIG. 2 shows an effect schematic diagram of projecting collected laser point clouds to a reflected value map.

Please refer to FIG. 2, which shows an effect schematic diagram of projecting the collected laser point clouds to the reflected value map.

FIG. 2 shows a node 201 in the reflected value map. The node 201 includes a plurality of square cells among which the cells with oblique lines represent obtaining UTM coordinates of the laser points in the collected laser point clouds according to one sampling pose, the laser point clouds are projected according to the UTM coordinates of the laser points in the collected laser point clouds corresponding to this sampling pose, and the laser points in the collected laser point clouds are projected to the cells. The sampling pose includes a sampling plane position and a sampling yaw angle. O represents a corresponding point of the center point of the laser radar with the sampling pose in the reflected value map.

Figure 3:
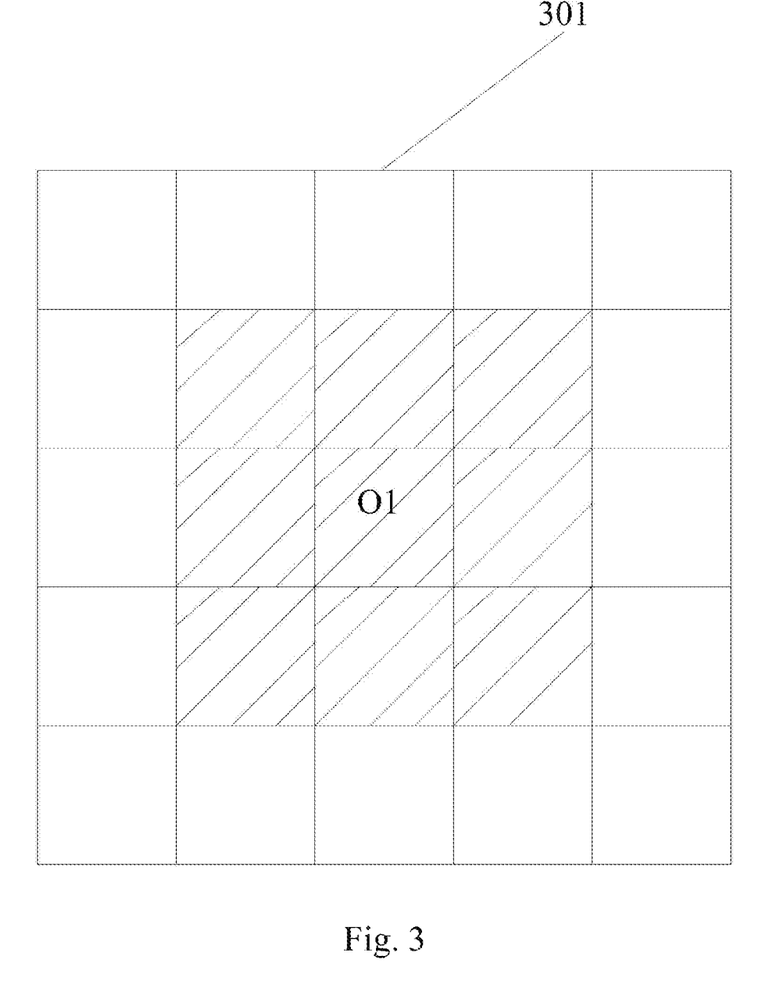
FIG. 3 shows another effect schematic diagram of projecting the collected laser point clouds to the reflected value map.

Please refer to FIG. 3, which shows an effect schematic diagram of projecting the collected laser point clouds to the reflected value map.

A node 301 in the reflected value map is shown, and includes a plurality of square cells, and the node 301 and the node 201 in FIG. 2 are an identical node in the reflected value map. Among the plurality of cells in the node 301, the cells with oblique lines represent obtaining the UTM coordinates of the laser points in the collected laser point clouds according to another sampling pose, the laser point clouds are projected according to the UTM coordinates of the laser points in the collected laser point clouds corresponding to the another sampling pose, and the laser points in the collected laser point clouds are projected to the cells. The another sampling pose includes a sampling plane position and a sampling yaw angle. The another sampling pose and the sampling pose in the above description of FIG. 2 have an identical sampling yaw angle, but the sampling plane position of the another sampling pose drifts one cell on the x axis of the reflected value map compared with the sampling plane position of the sampling pose in the above description of FIG. 2. O1 represents a corresponding point of the center point of the laser radar with the another sampling pose in the reflected value map.

In the present embodiment, considering the problem of a high overhead of projecting the collected laser point clouds to the reflected value map, the laser points in the collected laser point clouds may be projected to corresponding meshes in the reflected value map in the following manner to calculate the matching probability: a spin matrix corresponding to a plurality of sampling yaw angles may adopt $R_1, R_2 \ldots R_N$, but the translation matrix corresponding to the initial three-dimensional coordinate in the initial pose may be represented by t, thereby obtaining a group of poses $[R_1, t], [R_2, t], \ldots, [R_N, t]$. For each pose in $[R_1, t], [R_2, t], \ldots, [R_N, t]$, the coordinates of the laser points in the collected laser point clouds under the world coordinate system corresponding to each pose may be obtained respectively. Then, according to the coordinates of the laser points in the collected laser point clouds under the UTM coordinate system corresponding to each pose, the laser points in the collected laser point clouds are projected to corresponding cells in the reflected value map respectively. Therefore, only the projection of the number of times of the number of the sampling yaw angles is carried out.

After the laser points in the collected laser point clouds are projected to corresponding cells in the reflected value map for each pose in $[R_1, t], [R_2, t], \ldots, [R_N, t]$, the position of the center point of the laser radar on the reflected value map after the projection for this pose may be moved on the reflected value map respectively according to each pose; and accordingly, the positions of the laser points in the collected laser point clouds in the reflected value map after the projection for this pose are also moved in the reflected value map for an identical distance with the position of the center point of the laser point. For example, the position of the center point of the laser radar on the reflected value map after the projection for an pose may be moved for a distance of a cell in an x-axis direction or a y-axis direction on the reflected value map; and accordingly, the positions of the laser points in the collected laser point clouds on the reflected value map after the projection for this pose are also moved for a distance of a cell in the x-axis direction or the y-axis direction on the reflected value map. Finally, the mean value of reflected values or heights and the variance of the reflected values or the heights of the collected laser points in each cell after movement may be calculated. Because the movement of the center point of the laser radar after the projection for an pose forms a sampling position of the center point of a laser radar, and the yaw angle in the pose is a sampling yaw angle, it is equivalent to that a sampling pose is constructed, and the constructed sampling pose contains sampling yaw angles in a sampling plane position and an pose obtained after the movement. Accordingly, the mean value of the reflected values or the heights and the variance of the reflected values or the heights of the collected laser points in each cell after movement may be used as projection data corresponding to the sampling pose. Therefore, the matching probability between the projection data corresponding to the sampling pose and the map data of the reflected value map may be further calculated.

In some optional implementations of the present embodiment, after projecting the collected laser points for an sampling pose (x, y, yaw), the matching probability p(z|x, y, yaw) between the projection data corresponding to each sampling pose (x, y, yaw) and the map data of the reflected value map may be calculated respectively by adopting the following formula:

$$P(z \mid x, y, \text{yaw}) = e^{\sum_{i,j} \frac{(\chi_{i,j} - \chi^m_{i-x, j-y})^2 \cdot \rho^2 \cdot \rho_m^2}{\rho^2 + \rho_m^2}}.$$

$\chi_{i,j}$ represents a mean value of reflected values or heights of laser points based on projecting a sampling pose into a cell with a subscript of (i, j) in the reflected value map, $\chi^m_{i-x, j-y}$ represents a preset mean value of the reflected values or heights corresponding to the cell with the subscript of (i, j) in the reflected value map, $\rho^2$ represents a variance of the reflected values or heights of the laser points based on projecting the sampling pose into the cell with the subscript of (i, j) in the reflected value map, and $\rho_m^2$ represents a preset variance of the reflected values or heights corresponding to the cell with the subscript of (i, j) in the reflected value map.

When projecting the collected laser point clouds to corresponding cells in the reflected value map for a sampling pose, the laser points in the laser point clouds may be projected to a plurality of cells in the reflected value map, wherein the subscripts of the plurality of cells are represented by (i, j), i may represent a serial number of the cell in the x-axis direction in a node of the reflected value map, and j may represent a serial number of the cell in the y-axis direction in the node of the reflected value map. The cells to which the laser points in the collected laser point clouds are projected may be determined according to the UTM coordinates of the laser points in the collected laser point clouds obtained for the sampling pose, and the mean value of the reflected values or the heights and the variance of the reflected values or the heights of the laser points projected to the cell with a subscript of (i, j) may then be calculated, so that the matching probability between the projection data corresponding to the sampling pose and the map data of the reflected value map may be calculated based on the mean value and the variance of the reflected values of the reflected values or the heights of the laser points based on the sampling pose projecting into the cell with the subscript of (i, j), and a preset mean value of the reflected value or the heights and a preset variance of the reflected values or the heights corresponding to the cell with the subscript of (i, j).

In Step 103, an optimal pose is calculated based on the matching probability corresponding to each sampling pose, and determining the position of the vehicle based on the optimal pose.

In the present embodiment, an a posteriori matching probability corresponding to the sampling pose may represent the probability that the sampling pose is an actual pose of the center point of the laser radar. The optimal pose may be calculated based on the a posteriori matching probability corresponding to the each sampling pose (x, y, yaw). The optimal pose includes: an optimal plane position and an optimal yaw angle of the center point of the laser radar in the world coordinate system. After the optimal plane position and the optimal yaw angle of the center point of the laser radar in the world coordinate system are determined, because the center point of the laser radar is fixed relative to the position of the vehicle, the position of the vehicle may then be determined. The position of the vehicle may refer to the position of the center point of the vehicle. The position of the center point of the vehicle may include a plane position of the center point of the vehicle, and a yaw angle of the center point of the vehicle. For example, the optimal plane position of the center point of the laser radar may be used as the plane position of the center point of the vehicle, and the optimal yaw angle of the center point of the laser radar may be used as the yaw angle of the center point of the vehicle. After the position of the center point of the vehicle is determined, an area occupied by the vehicle may be further determined according to a size of the vehicle.

In some optional implementations of the present embodiment, after the a posteriori matching probability corresponding to each sampling pose is calculated, the corresponding sampling pose with the maximum posteriori matching probability may be used as the optimal pose, namely the sampling plane position in the corresponding sampling pose with the maximum a posteriori matching probability is used as the optimal plane position, and the sampling yaw angle in the corresponding sampling pose with the maximum a posteriori matching probability is used as the optimal yaw angle.

In some optional implementations of the present embodiment, after the a posteriori matching probability corresponding to each sampling pose is calculated, a histogram filter may be updated with the matching probability corresponding to each sampling pose. A predicted value of the a posteriori matching probability obtained based on a calculation result of the matching probability of a historical laser point cloud is stored in the histogram filter. The a posteriori matching probability P(x, y, yaw) corresponding to each sampling pose (x, y, yaw) may be calculated respectively by adopting the following formula:

$$P(x,y,yaw)=\mu \cdot P(z|x,y,yaw) \cdot p(x,y,yaw).$$

P(z|x, y, yaw) represents the matching probability between the projection data of a sampling pose and the map data of the reflected value map, p(x, y, yaw) represents a predicted value of the a posteriori matching probability obtained based on a calculation result of the matching probability of a historical laser point cloud, the predicted value may be obtained from the histogram filter, and μ represents a normalization coefficient.

After the a posteriori matching probability corresponding to each sampling pose is calculated, a multiplication product of the a posteriori matching probability P(x, y, yaw) corresponding to each sampling pose (x, y, yaw) and a value of the sampling plane position in (x, y, yaw) on the x axis may be calculated respectively to obtain a plurality of first weighted terms; and the sum of the plurality of first weighted terms is divided by the sum of the a posteriori matching probabilities corresponding to all sampling poses to obtain a value of the optimal plane position on the x axis. The value X of the optimal plane position on the x axis may be represented as:

$$X = \frac{\sum_{x,y,yaw} P(x, y, yaw)^\alpha \cdot x}{\sum_{x,y,yaw} P(x, y, yaw)^\alpha}.$$

The first weighted term may be represented as $P_{(x,y,yaw)}{}^\alpha \cdot x'$, and for a sampling pose (x, y, yaw), P(x, y, yaw) in the first weighted term may represent the a posteriori matching probability corresponding to the (x, y, yaw), and X in the first weighted term may be the x in the (x, y, yaw). α is a constant parameter.

After the a posteriori matching probability corresponding to each sampling pose is calculated, a multiplication product of the a posteriori matching probability corresponding to each sampling pose and a value of the sampling plane position in the sampling pose on the y axis may be calculated respectively to obtain a plurality of second weighted terms; and the sum of the plurality of second weighted terms is divided by the sum of the a posteriori matching probabilities corresponding to all sampling poses to obtain a value of the optimal plane position on the y axis. The value y of the optimal plane position on the y axis may be represented as:

$$Y = \frac{\sum_{x,y,yaw} P(x, y, yaw)^\alpha \cdot y}{\sum_{x,y,yaw} P(x, y, yaw)^\alpha}.$$

The second weighted term may be represented as $P_{(x,y,yaw)}{}^\alpha \cdot y$, and for a sampling pose (x, y, yaw), P(x, y, yaw) in the second weighted term may represent the a posteriori matching probability corresponding to the (x, y, yaw), and the y in the second weighted term may be the y in the (x, y, yaw). α is a constant parameter.

After the a posteriori matching probability corresponding to each sampling pose is calculated, a multiplication product of the a posteriori matching probability corresponding to each sampling pose and a sampling yaw angle in the sampling pose may be calculated respectively to obtain a plurality of third weighted terms; and the sum of the plurality of third weighted terms is divided by the sum of the a posteriori matching probabilities corresponding to all sampling poses to obtain the optimal yaw angle in the optimal pose. The optimal yaw angle $_{YAW}$ may be represented as:

$$YAW = \frac{\sum_{x,y,yaw} P(x, y, yaw)^\alpha \cdot yaw}{\sum_{x,y,yaw} P(x, y, yaw)^\alpha}.$$

The third weighted term may be represented as $P_{(x,y,yaw)}{}^\alpha \cdot yaw$, and for a sampling pose (x, y, yaw), P(x, y, yaw) in the third weighted term may represent the a posteriori matching probability corresponding to the (x, y, yaw), and the yaw in the third weighted term may be the yaw in the (x, y, yaw). α is a constant parameter.

Figure 4:
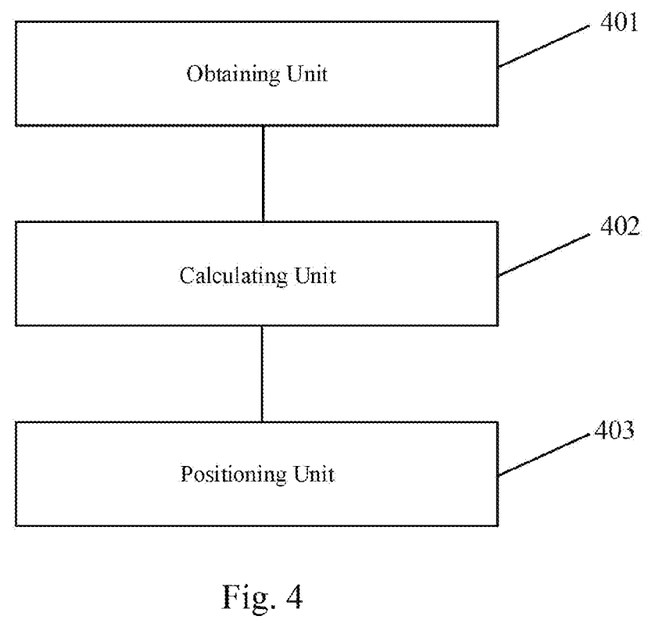
FIG. 4 shows a structure diagram of an embodiment of the apparatus for positioning a vehicle according to the present application.

Please refer to FIG. 4, which shows a structure diagram of an embodiment of the apparatus for positioning a vehicle according to the present application. The apparatus for positioning a vehicle includes: an obtaining unit 401, a calculating unit 402, and a positioning unit 403. wherein, the obtaining unit 401 is configured for obtaining laser point cloud data of a laser point cloud collected by a laser radar on a vehicle, and obtaining an initial pose of a center point of the laser radar, the laser point cloud data comprising coordinates of laser points under a coordinate of the laser radar, and the initial pose comprising an initial plane position and an initial yaw angle of the center point of the laser radar in a world coordinate system; the calculating unit 402 is configured for calculating a matching probability between projection data corresponding to each sampling pose and map data of a reflected value map respectively, the sampling pose including a sampling plane position in a preset range of the initial plane position, and a sampling yaw angle in a preset range of the initial yaw angle, the projection data including a mean value and a variance of reflected values or heights of laser points in the collected laser point cloud based on projecting the sampling pose into a cell of the reflected value map and the map data including a preset mean value and a preset variance of the reflected values or heights corresponding to the cell; and the positioning unit 403 is configured for calculating an optimal pose based on the matching probability between the projection data corresponding to the each sampling pose and the map data of the reflected value map, and determining the position of the vehicle based on the optimal pose.

In some optional implementations of the present embodiment, the calculating unit 402 includes: a matching probability calculating subunit (not shown), configured for calculating the matching probability P(z|x, y, yaw) between the projection data corresponding to each sampling pose and the map data of the reflected value map respectively by adopting the following formula:

$$P(z \mid x, y, yaw) = e^{\sum_{i,j} \frac{(x_{i,j} - x^m_{i-x,j-y})^2 \cdot \rho^2 \cdot \rho_m^2}{\rho^2 + \rho_m^2}}.$$

Where, $\chi_{i,j}$ represents a mean value of reflected values or heights of laser points based on projecting a sampling pose into a cell with a subscript of (i, j) in the reflected value map, $\chi_{i-x,j-y}{}^m$ represents a preset mean value of the reflected values or heights corresponding to the cell with the subscript of (i, j) in the reflected value map, $\rho^2$ represents a variance of the reflected values or heights of the laser points based on projecting the sampling pose into the cell with the subscript of (i, j) in the reflected value map, and $\rho_m^2$ represents a preset variance of the reflected values or heights corresponding to the cell with the subscript of (i, j) in the reflected value map.

In some optional implementations of the present embodiment, the positioning unit 403 includes: a first optimal pose determining subunit (not shown), configured for using a corresponding sampling pose with the maximum matching probability as the optimal pose; and a second optimal pose determining subunit, configured for: calculating a multiplication product of the a posteriori matching probability corresponding to the each sampling pose and a value of a sampling plane position on an x axis in the sampling pose respectively to obtain a plurality of first weighted terms; dividing a sum of the plurality of first weighted terms by a sum of the a posteriori matching probabilities corresponding to all sampling poses to obtain a value of an optimal plane position on the x axis; calculating a multiplication product of the a posteriori matching probability corresponding to the each sampling pose and a value of the sampling plane position on a y axis in the sampling pose respectively to obtain a plurality of second weighted terms; dividing the sum of the plurality of second weighted terms by the sum of the a posteriori matching probabilities corresponding to all sampling poses to obtain a value of the optimal plane position on the y axis; calculating a multiplication product of the a posteriori matching probability corresponding to the each sampling pose and a sampling yaw angle in the sampling pose respectively to obtain a plurality of third weighted terms; and dividing the sum of the plurality of third weighted terms by the sum of the a posteriori matching probabilities corresponding to all sampling poses to obtain an optimal yaw angle.

Figure 5:
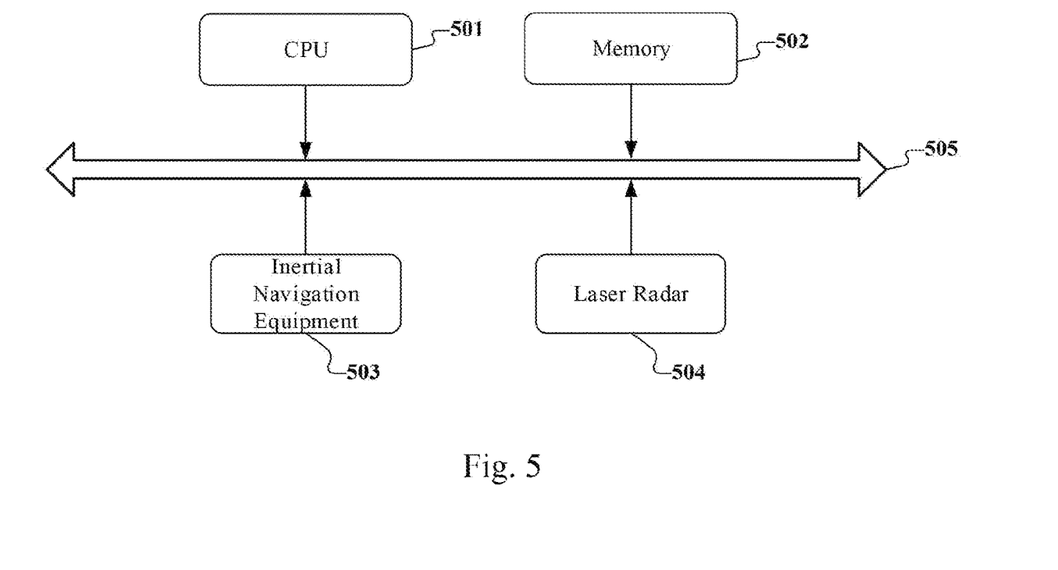
FIG. 5 shows a structure diagram of an embodiment of the vehicle in the present application.

Please refer to FIG. 5, which shows a structure diagram of an embodiment of the vehicle according to the present application.

As shown in FIG. 5, the vehicle includes a CPU 501, a memory 502, inertial navigation equipment 503, and a laser radar 504, wherein the CPU 501, the memory 502, the inertial navigation equipment 503 and the laser radar 503 are connected with one another through a bus 505. The method for positioning a vehicle according to the present application can be implemented as a computer program which includes instructions of operations described in the above steps 101-103. The computer program can be stored in the memory 502. The CPU 501 of the vehicle calls the computer program stored in the memory 502 to position the vehicle in real time.

The present application further provides a computer readable medium which can be included in a driving control system of the vehicle, and can also be a separate existence. The computer readable medium carries one or more programs, and when the one or more programs are executed by the CPU of the vehicle, it is capable of: obtaining laser point cloud data of a laser point cloud collected by a laser radar on a vehicle, and obtaining an initial pose of a center point of the laser radar, the laser point cloud data including coordinates of laser points under a coordinate of the laser radar, and the initial pose including an initial plane position and an initial yaw angle of the center point of the laser radar in a world coordinate system; calculating a matching probability between projection data corresponding to each sampling pose and map data of a reflected value map respectively, the sampling pose including a sampling plane position in a preset range of the initial plane position, and a sampling yaw angle in a preset range of the initial yaw angle, the projection data including a mean value and a variance of reflected values or heights of laser points in the collected laser point cloud based on projecting the sampling pose into a cell of the reflected value map and the map data comprising a preset mean value and a preset variance of the reflected values or heights corresponding to the cell; and calculating an optimal pose based on the matching probability between the projection data corresponding to the each sampling pose and the map data of the reflected value map, and determining a position of the vehicle based on the optimal pose, the optimal pose including an optimal plane position and an optimal yaw angle of the center point of the laser radar in the world coordinate system.

It should be noted that the above computer readable medium can be a computer readable signal medium, or a computer readable storage medium, or any combination of the above two. The computer readable storage medium, for example, can include but not limited to, systems, devices or apparatus, or any combination of electricity, magnetism, light, electromagnetism, infrared rays or semiconductors. The computer readable storage medium, for more specific examples, may include but not limited to: an electrical connection with one or more leads, a portable computer disk, a hard disk, a random access memory (RAM), a read-only memory (ROM), an erasable programmable read-only memory (EPROM or Flash), an optical fiber, a portable compact disk read-only memory (CD-ROM), an optical memory, a magnetic memory, or any combination of the above appropriate parts. In the present application, the computer readable storage medium can be any tangible medium including or storing programs which can be used by or used in conjunction with instruction execution systems, devices or apparatus. However, in the present application, a computer readable signal medium can include data signals propagating in a baseband or as a part of a carrier, and carry computer readable program codes. Such transmitted data signals may be in a variety of forms, including but not limited to electromagnetic signals, optical signals, or any suitable combination of the above signals. The computer readable signal medium can also be any computer readable medium outside the computer readable storage medium, and the computer readable medium can be applied by sending, propagating or transmitting to programs used by or used in conjunction with instruction execution systems, devices or apparatus. The program codes included on the computer readable medium can be transmitted in any suitable medium, including but not limited to: wireless, wired, optical cable, RF and other media, or any suitable combination of what mentioned above.

The foregoing is only a description of the embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the disclosure, such as, technical solutions formed by replacing the features as disclosed in the present application with (but not limited to), technical features with similar functions. Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for positioning a vehicle, the method comprising:

obtaining laser point cloud data of a laser point cloud collected by a laser radar on a vehicle, and obtaining an initial pose of a center point of the laser radar, the laser point cloud data comprising coordinates of laser points under a coordinate of the laser radar, and the initial pose comprising an initial plane position and an initial yaw angle of the center point of the laser radar in a world coordinate system;

calculating a matching probability between projection data corresponding to each sampling pose and map data of a reflected value map respectively, the sampling pose comprising a sampling plane position in a preset range of the initial plane position, and a sampling yaw angle in a preset range of the initial yaw angle, the projection data comprising a mean value and a variance of reflected values or heights of laser points in the collected laser point cloud based on projecting the sampling pose into a cell of the reflected value map and the map data comprising a preset mean value and a preset variance of the reflected values or heights corresponding to the cell; and calculating an optimal pose based on the matching probability between the projection data corresponding to the each sampling pose and the map data of the reflected value map, and determining a position of the vehicle based on the optimal pose, the optimal pose comprising an optimal plane position and an optimal yaw angle of the center point of the laser radar in the world coordinate system, wherein the method is performed by one or more processors.

2. The method according to claim 1, wherein the calculating a matching probability between projection data corresponding to each sampling pose and map data of a reflected value map respectively comprises:

calculating the matching probability P(z|x, y, yaw) between the projection data corresponding to the each sampling pose and the map data of the reflected value map respectively by adopting the following formula:

$$P(z \mid x, y, \text{yaw}) = e^{\sum_{i,j} \frac{(\chi_{i,j} - \chi^m_{i-x, j-y})^2 \cdot \rho^2 \cdot \rho_m^2}{\rho^2 + \rho_m^2}}$$

wherein, $\chi_{i,j}$ represents a mean value of reflected values or heights of laser points based on projecting a sampling pose into a cell with a subscript of (i, j) in the reflected value map, $\chi^m_{i-x, j-y}$ represents a preset mean value of the reflected values or heights corresponding to the cell with the subscript of (i, j) in the reflected value map, $\rho^2$ represents a variance of the reflected values or heights of the laser points based on projecting the sampling pose into the cell with the subscript of (i, j) in the reflected value map, and $\rho_m^2$ represents a preset variance of the reflected values or heights corresponding to the cell with the subscript of (i, j) in the reflected value map.

3. The method according to claim 2, wherein the calculating an optimal pose based on the matching probability between the projection data corresponding to the each sampling pose and the map data of the reflected value map comprises:

regarding a corresponding sampling pose with the maximum matching probability as the optimal pose.

4. The method according to claim 2, wherein the calculating an optimal pose based on the matching probability between the projection data corresponding to the each sampling pose and the map data of the reflected value map comprises:

calculating an a posteriori matching probability p(x, y, yaw) corresponding to the each sampling pose respectively by adopting the following formula:

$$P(x,y,yaw) = \mu \cdot P(z|x,y,yaw) \cdot p(x,y,yaw)$$

wherein, P(z|x, y, yaw) represents the matching probability between the projection data of a sampling pose and the map data of the reflected value map, p(x, y, yaw) represents a predicted value of the a posteriori matching probability obtained based on a calculation result of the matching probability of a historical laser point cloud, and µ is a normalization coefficient; and calculating the optimal pose based on the a posteriori matching probability corresponding to the each sampling pose.

5. The method according to claim 4, wherein the calculating the optimal pose based on the a posteriori matching probability corresponding to the each sampling pose comprises:

calculating a multiplication product of the a posteriori matching probability corresponding to the each sampling pose and a value of a sampling plane position on an x axis in the sampling pose respectively to obtain a plurality of first weighted terms;

dividing a sum of the plurality of first weighted terms by a sum of the a posteriori matching probabilities corresponding to all sampling poses to obtain a value of an optimal plane position on the x axis;

calculating a multiplication product of the a posteriori matching probability corresponding to the each sampling pose and a value of the sampling plane position on a y axis in the sampling pose respectively to obtain a plurality of second weighted terms;

dividing the sum of the plurality of second weighted terms by the sum of the a posteriori matching probabilities corresponding to all sampling poses to obtain a value of the optimal plane position on the y axis;

calculating a multiplication product of the a posteriori matching probability corresponding to the each sampling pose and a sampling yaw angle in the sampling pose respectively to obtain a plurality of third weighted terms; and dividing the sum of the plurality of third weighted terms by the sum of the a posteriori matching probabilities corresponding to all sampling poses to obtain an optimal yaw angle.

6. An apparatus for positioning a vehicle, the apparatus comprising:

at least one processor; and a memory storing instructions, which when executed by the at least one processor, cause the at least one processor to perform operations, the operations comprising:

obtaining laser point cloud data of a laser point cloud collected by a laser radar on a vehicle, and obtaining an initial pose of a center point of the laser radar, the laser point cloud data comprising coordinates of laser points under a coordinate of the laser radar, and the initial pose comprising an initial plane position and an initial yaw angle of the center point of the laser radar in a world coordinate system;

calculating a matching probability between projection data corresponding to each sampling pose and map data of a reflected value map respectively, the sampling pose comprising a sampling plane position in a preset range of the initial plane position, and a sampling yaw angle in a preset range of the initial yaw angle, the projection data comprising a mean value and a variance of reflected values or heights of laser points in the collected laser point cloud based on projecting the sampling pose into a cell of the reflected value map and the map data comprising a preset mean value and a preset variance of the reflected values or heights corresponding to the cell; and calculating an optimal pose based on the matching probability between the projection data corresponding to the each sampling pose and the map data of the reflected value map, and determining a position of the vehicle based on the optimal pose.

7. The apparatus according to claim 6, wherein the calculating a matching probability between projection data corresponding to each sampling pose and map data of a reflected value map respectively comprises:

calculating the matching probability P(z|x, y, yaw) between the projection data corresponding to the each sampling pose and the map data of the reflected value map respectively by adopting the following formula:

$$P(z|x, y, yaw) = e^{\sum_{i,j} \frac{(\chi_{i,j} - \chi_{i-x,j-y}^m)^2 \cdot \rho^2 \cdot \rho_m^2}{\rho^2 + \rho_m^2}}$$

wherein, $\chi_{i,j}$ represents a mean value of reflected values or heights of laser points based on projecting a sampling pose into a cell with a subscript of (i, j) in the reflected value map, $\chi_{i-x,j-y}^m$ represents a preset mean value of the reflected values or heights corresponding to the cell with the subscript of (i, j) in the reflected value map, $\rho^2$ represents a variance of the reflected values or heights of the laser points based on projecting the sampling pose into the cell with the subscript of (i, j) in the reflected value map, and $\rho_m^2$ represents a preset variance of the reflected values or heights corresponding to the cell with the subscript of (i, j) in the reflected value map.

8. The apparatus according to claim 7, wherein the operations further comprises:

regarding a corresponding sampling pose with the maximum matching probability as an optimal pose;

calculating a multiplication product of the a posteriori matching probability corresponding to the each sampling pose and a value of a sampling plane position on an x axis in the sampling pose respectively to obtain a plurality of first weighted terms; dividing a sum of the plurality of first weighted terms by a sum of the a posteriori matching probabilities corresponding to all sampling poses to obtain a value of an optimal plane position on the x axis; calculating a multiplication product of the a posteriori matching probability corresponding to the each sampling pose and a value of the sampling plane position on a y axis in the sampling pose respectively to obtain a plurality of second weighted terms; dividing the sum of the plurality of second weighted terms by the sum of the a posteriori matching probabilities corresponding to all sampling poses to obtain a value of the optimal plane position on the y axis; calculating a multiplication product of the a posteriori matching probability corresponding to the each sampling pose and a sampling yaw angle in the sampling pose respectively to obtain a plurality of third weighted terms; and dividing the sum of the plurality of third weighted terms by the sum of the a posteriori matching probabilities corresponding to all sampling poses to obtain an optimal yaw angle.

9. A non-transitory computer storage medium storing a computer program, which when executed by one or more processors, causes the one or more processors to perform operations, the operations comprising:

obtaining laser point cloud data of a laser point cloud collected by a laser radar on a vehicle, and obtaining an initial pose of a center point of the laser radar, the laser point cloud data comprising coordinates of laser points under a coordinate of the laser radar, and the initial pose comprising an initial plane position and an initial yaw angle of the center point of the laser radar in a world coordinate system;

calculating a matching probability between projection data corresponding to each sampling pose and map data of a reflected value map respectively, the sampling pose comprising a sampling plane position in a preset range of the initial plane position, and a sampling yaw angle in a preset range of the initial yaw angle, the projection data comprising a mean value and a variance of reflected values or heights of laser points in the collected laser point cloud based on projecting the sampling pose into a cell of the reflected value map and the map data comprising a preset mean value and a preset variance of the reflected values or heights corresponding to the cell; and calculating an optimal pose based on the matching probability between the projection data corresponding to the each sampling pose and the map data of the reflected value map, and determining a position of the vehicle based on the optimal pose, the optimal pose comprising an optimal plane position and an optimal yaw angle of the center point of the laser radar in the world coordinate system.

\* \* \* \* \*